United States Patent [19]

Gnuechtel et al.

[11] Patent Number: 4,794,453
[45] Date of Patent: Dec. 27, 1988

[54] METHOD AND APPARATUS FOR STROBOSCOPIC VIDEO INSPECTION OF AN ASYNCHRONOUS EVENT

[75] Inventors: Herman C. Gnuechtel, Arlington Heights; Stephen P. Kosmen, Hoffman Estates, both of Ill.

[73] Assignee: Web Printing Controls Co., Barrington, Ill.

[21] Appl. No.: 905,707

[22] Filed: Sep. 9, 1986

[51] Int. Cl.⁴ .............................................. H04N 7/18
[52] U.S. Cl. ...................................... 358/101; 358/148
[58] Field of Search ................. 358/101, 107, 93, 139, 358/213.11, 148; 382/8; 364/569, 579

[56] References Cited

U.S. PATENT DOCUMENTS

| | | |
|---|---|---|
| 3,896,474 | 7/1975 | Amelio et al. . |
| 3,896,485 | 7/1975 | Early . |
| 3,931,465 | 1/1976 | Levine . |
| 3,996,600 | 12/1976 | Patrin . |
| 4,232,336 | 11/1980 | Henry .............................. 358/107 X |
| 4,242,599 | 12/1980 | Suzuki . |
| 4,270,252 | 6/1981 | Harrison et al. . |
| 4,302,779 | 11/1981 | Inoue . |
| 4,322,753 | 3/1982 | Ishihara . |
| 4,338,024 | 7/1982 | Bolz et al. . |
| 4,428,287 | 1/1984 | Greiner . |
| 4,450,484 | 5/1984 | Terakawa et al. . |
| 4,462,047 | 7/1984 | Fujimoto et al. . |
| 4,481,538 | 11/1984 | Battson et al. . |
| 4,511,253 | 4/1985 | Glockner et al. . |
| 4,511,926 | 4/1985 | Crossland et al. . |
| 4,567,506 | 1/1986 | Shinoda et al. ................. 358/101 X |
| 4,586,080 | 4/1986 | Hoyt et al. . |
| 4,636,849 | 1/1987 | Wada et al. ..................... 358/101 X |

Primary Examiner—Howard W. Britton
Assistant Examiner—Victor R. Kostak
Attorney, Agent, or Firm—Welsh & Katz, Ltd.

[57] ABSTRACT

Apparatus and method particularly suitable for use with the closed loop color to color registration system of a commercial web printing apparatus utilizes a CCD camera having an image sensor and a synchronization generator circuit which generates periodic scan pulses which trigger the image acquisition scan of the image sensor. A predetermined time prior to triggering of a strobe a prefresh pulse is generated in order to trigger a complete scan of the image sensor prior to firing the strobe. A predetermined time period subsequent to the firing of the strobe a scan triggering pulse is generated to trigger an image acquisition scan of the image sensor. This results in highly stable and reliable acquisition of a low noise image of for example, a registration mark on a printed web which may then be processed by a registration control system.

21 Claims, 7 Drawing Sheets

FIG_1A_

FIG_1B_

FIG-7

METHOD AND APPARATUS FOR STROBOSCOPIC VIDEO INSPECTION OF AN ASYNCHRONOUS EVENT

This invention relates generally to the field of stroboscopic inspection by a video camera in real-time of asynchronous dynamic events, and more particularly to a method and apparatus for synchronizing high intensity, short duration illumination of a substantially predictable asynchronous event in real-time with image acquisition by a video camera particularly suitable for a closed loop color to color registration system in commercial web printing apparatus.

Video inspection of dynamic events is well recognized in the prior art as an important element in the implementation of various automated functions in commercial and industrial environments. Of particular interest is the ability to perform video inspection of an asynchronous event which occurs or recurs at a predictable time or within a known time window. Such inspection of moving or dynamic scenes typically utilize high intensity, short duration illumination (i.e., stroboscopic illumination) to stop the motion together with a video camera to acquire an image of the scene. Frequently the events are changing at high speed and therefore precision timing is required in order to capture an image of the event.

As an example, in multi-color printing machines in which successive printing operations are performed in a plurality of colors on a moving web at successive repeat lengths it is necessary that the locations on the web at which the successive printing operations are performed have a predetermined relationship to one another. Thus, each printing operation applies a different color in a predetermined pattern to the web superimposed to form a desired multi-color image. To obtain high quality resolution in the final product it is necessary that the patterns printed be precisely aligned. This alignment is referred to as registration.

It is known in the prior art that registration of the printed pattern may be checked by printing registration or alignment marks on the printed web. This may be done, for example, by applying a mark of one color having a tolerance range and then printing a mark of another color within the tolerance range of the first mark. The operator then evaluates the registration marks and by controlling axial, circumferential, and skew adjustments controls registration. This adjustment process is very time-consuming and demanding on press operators and introduces the possibility of error as well as limiting the accuracy with which register may be controlled. Thus, automatic measurement and control of registration adjustment is highly desirable.

One approach to automatic registration control compares the location of the registration mark on the web at each printing stage and adjusts the work applying members until the locations of the marks have a predetermined relationship. Such a system employs a photoelectric sensor for detecting the position of the registration marks applied to the web. Thus, an inexpensive and reliable photo-sensing device is highly desirable for acquiring an image of the registration marks in such an automated system.

Charge coupled device (CCD) video cameras provide such a reliable and inexpensive video sensor. By utilizing a CCD video camera, a video image of the signature of the web or a portion thereof can be acquired and processed by an automatic control system to identify registration marks and their locations. Since the signature has a consistent repeat length, the approximate recurring location of the registration marks is predictable. To acquire a video image from the moving web, a high intensity, short duration illuminating source (e.g., a strobe light) may be utilized to stop the motion. However, in the prior art, CCD cameras were not suitable for use with a strobe to acquire the image of an asynchronous event because the CCD video camera requires that a field scan be completed immediately prior to the strobe firing due to the charging and strip requirements of the CCD sensor. In addition, electromagnetic interference created by the strobe destroys some of the image data being acquired. This prevents reliable image data acquisition and analysis.

It is accordingly an object of this invention to provide a novel method and apparatus for synchronizing a video camera to the stroboscopic illumination of an asynchronous event to permit reliable high speed real-time image acquisition.

It is another object of the invention to provide a novel method and apparatus for triggering a prescanning of a CCD video camera sensor a predetermined time period prior to stroboscopically illuminating a predictable asynchronous event and delaying image acquisition for a predetermined time period after the initiation of the stroboscopic illumination.

It is yet another object of the invention to provide a novel and reliable method and apparatus for synchronizing a CCD camera with a multi-color web printing apparatus to acquire video image data of registration marks which are stroboscopically illuminated.

Briefly, according to one embodiment of the invention, apparatus is provided for synchronizing a high intensity short duration illumination of a substantially predictable asynchronous event with image acquistion by a video camera having an image sensor and a synchronization generator circuit which generates periodic scan pulses which trigger an image acquisition scan of the image sensor. The apparatus comprises means for disabling the periodic scan pulses of the synchronization generator circuits and means for generating a prefresh pulse for triggering an image acquisition scan of the image sensor a first predetermined time period prior to the predictable event. In addition, means are provided for triggering an image acquisition scan of the image sensor subsequent to the first predetermined time period.

BRIEF DESCRIPTION OF THE DRAWINGS

The invention, together with further objects and advantages thereof, may be understood by reference to the following description taken in conjunction with the accompanying drawings.

DETAILED DESCRIPTION OF THE PREFERRED EMBODIMENT

Figure 1A:
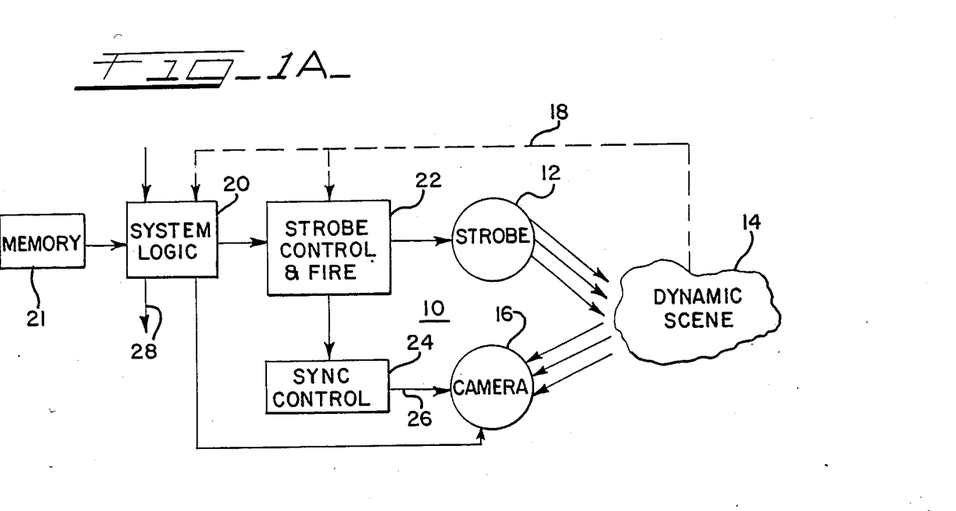
FIG. 1A is a generalized block diagram illustrating a specific embodiment of apparatus for synchronized stroboscopic image acquisition of a dynamic asynchronous event according to the invention.

FIG. 1A is a generalized block diagram illustrating a specific embodiment of apparatus 10 for synchronized stroboscopic inspection of a predictable dynamic asynchronous event by a video camera 16 according to the invention. In the apparatus 10, a high intensity, short duration illuminator 12 (e.g., a conventional strobe light, a pulsed laser, etc.) is utilized to illuminate a dynamic scene 14 in order to stop the motion of the scene to permit inspection of a substantially predictable specific event by the image acquisition camera 16. The illumination does not have to be visible light, for example, infra-red light can be effectively used in conjunction with a CCD video camera.

An event which is substantially predictable may be an event which repeats periodically or can be expected to appear within the image field of the camera often enough to be useful for the desired application. Thus, an event is predictable if the event is present for a length of time (a time window) and the occurrence of the time window can be predicted accurately enough to ensure that the scene is present within the field of view of the camera often enough to be adequate for the desired application.

For example, the scene may be a moving web within a multi-color web printing press and the event of interest may be the movement of a registration mark, indicia, or some desired portion of the the printed pattern (i.e., a portion of the web signature) printed on the web to a position within the image field of the image acquisition camera 16. Since the web printing apparatus utilizes a known repeat length, it can be predicted that the registration mark will return periodically to approximately the same location with an accuracy such that it will fall within the area viewed by the camera periodically with the period determined by the repeat length cycle time of the web printing apparatus.

As shown in the illustrated embodiment in FIG. 1, the dynamic scene 14 may be monitored, for example, by a position encoder (not shown) to provide a feedback signal 18 which is coupled to system logic circuitry 20 or to a strobe control circuit 22. This feedback signal 18 can be utilized in the prediction of the desired event. For example, in web printing apparatus, a position encoder is typically provided which indicates the start of each repeat length. This signal, together with the position of the registration mark relative to the beginning of the repeat length cycle can be utilized to predict a time when the mark will be within the camera image field. The strobe control 22, under control of the system logic 20, then can fire the illuminator 18 (e.g., a conventional strobe light in the illustrated embodiment) so as to stop the motion of the web at the predicted time when the registration mark is within view of the camera 16.

In the illustrated embodiment, the camera 16 is a WV-CD120 color CCD TV camera marketed by Panasonic. Such cameras are highly reliable and inexpensive consumer color cameras with free running internal synchronization generator circuitry to generate all necessary control and synchronization signals to control an image sensor array including the charge coupled devices (CCD). Thus, it is highly suitable for image acquisition in the apparatus 10. However, the image sensors of such cameras function very dynamically. Consequently, continuous cycles of stripping of charge levels accumulated during the previous field of image acquisition and a pre-charging of the CCD devices prior to a normal image acquisition scan of the sensor array are required to avoid distorted image output. Thus, the camera cannot merely wait for the asynchronous event in scene 14 and then do an image acquisition scan of the image sensor array when the strobe 12 is fired.

Therefore, a synchronization control circuit 24 keeps the camera prepared for image acquisition by continually generating refresh pulses and coupling the pulses to the camera 16 via a conductor 26, as shown. These refresh pulses trigger periodic strip and precharge cycles producing a periodic image acquisition scan (i.e., the vertical scan of the image sensor associated with generation of a field of video) cycle of the camera 16 image sensor. These refresh pulses must occur frequently enough to maintain the necessary dynamic characteristics of the camera (determined by the camera design) but the period may be longer than the normal vertical scan period (i.e., 16.6 milliseconds (ms) in the NTSC standard). Thus, the synchronization control circuit 24 may use the camera's normal vertical scan signals to generate the refresh pulses with a standard vertical scan period or may generate a signal independent of the normal vertical scan signals.

The synchronization control circuit 24 also generates a preconditioning (i.e., prefresh) pulse (at $t_1$ of FIG. 1B) a predetermined time period ($T_1$) prior to the predictable time ($t_0$) of the event of interest to trigger an image acquisition scan (i.e., vertical field scan) cycle which clears the array of any prior charge. After this preconditioning scan, the camera is essentially held in a holding pattern with the normal vertical scan signals disabled and the image sensor ready to be scanned for actual image acquisition. The predetermined time period $T_1$ should be at least one vertical scan period long in order to allow a complete vertical scan of the camera's image sensor in the illustrated embodiment. However, $T_1$ need only be at least long enough to allow vertical scan of a portion of the image sensor large enough to permit image data acquisition of a desired image. In some applications, the desired image may cover only part of the image sensor array. Thus, only that desired part of the image sensor need be scanned and consequently the period $T_1$ can be correspondingly shorter. However, if the desired image may not be reliably located in only a portion of the image sensor, then $T_1$ should correspond to a full vertical scan.

Figure 1B:
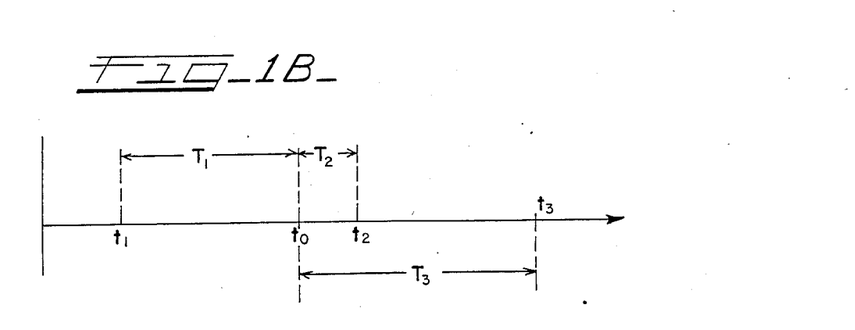
FIG. 1B is a generalized timing diagram illustrating a specific embodiment of the timing characteristics of the system illustrated in FIG. 1A.

A predetermined time period ($T_1$) after the image acquisition scan is triggered by the prefresh pulse (at $t_1$) the strobe 22 is fired (at $t_0$) in response to a control signal coupled from the strobe control circuit 22 to the strobe 12. The time $T_1$ may be made a precision time period (e.g., in the illustrated embodiment $T_1$ is 20 ms plus or minus 10 microseconds). Thus, the invention is suitable for image acquisition of high speed, short duration events requiring precision timing of the strobe and camera to capture an image of the event.

Subsequently, the synchronization control 24 couples a control signal (at $t_2$) to the camera 16 to trigger the actual image acquisition scan at a predetermined time period ($T_2$) after the strobe is fired. This second predetermined time period ($T_2$) prevents the electromagnetic interference from the strobe 12 from destroying image data during the image acquisition scan. The second predetermined time period should be long enough (e.g., 0.5 ms in the illustrated embodiment) to permit the interference to decay to a level sufficiently reduced to allow reliable image acquisition. This time period will therefore be dependent upon such factors as the proximity of the camera and strobe circuitry, degree of noise immunity designed into the circuits, etc.

The image data obtained during the image acquisition scan of the image sensor initiated at time $t_2$ is coupled from the camera 16 to the system logic 20, as shown, for storage in a memory 21 and for processing. For example, in the web printing press, the image is processed to determine the relative position of the different color registration marks and to generate control signals on an output bus 28 to control registration.

During an additional predetermined time period ($T_3$) the high voltage charging circuits of the strobe control circuits 22 may be disabled so that the strobe firing circuitry is not recharged in preparation for the next firing of the strobe 22. This disable period is useful when the charging circuits are in close proximity to the camera to prevent the charging process from interfering with the image acquisition and destroying image data. This time period should be long enough to either allow completion of a complete vertical scan of the sensor (i.e., at least 16.6 ms in the illustrated embodiment), or at least to allow the vertical scanning of a desired portion of the sensor array. After this final predetermined period ($T_3$), a signal is generated (at $t_3$) by the strobe control circuitry 22 enabling the charging of the high voltage circuit strobe control circuitry 22.

Referring now to FIGS. 2-8, there is illustrated a specific embodiment of the invention utilized within an automatic color to color registration system for a multi-color web printing apparatus 110. In FIG. 2A there is shown a pictorial view illustrating a portion of the web printing apparatus 110 with portions removed. A moving web 114 (shown to be substantially transparent to reveal associated rollers and the like) is positioned over rollers 53, 54 to facilitate movement of the web through the apparatus 110. Two image acquisition cameras 116, 116' (e.g., a model WV-CD120 color CCD TV camera by Panasonic) are provided to permit inspection of both sides of the printed web 114 together with associated strobe lights 112, 112' (e.g., a model FX-199 strobe marketed by EGG Optics) to provide stroboscopic illumination. The cameras 116, 116' are mounted, as shown, on supporting tracks 58, 58' which include positioning belts 60, 60' capable of moving the cameras 116, 116' to any desired position along the tracks 58, 58'. The belts 60, 60' are driven by conventional stepper motors 62 (only one shown), which are controlled by an image processor 130 (see FIG. 3) contained within the control circuitry enclosure 64, thereby enabling the processor 130 to control positioning of the cameras 116, 116'. FIG. 2B illustrates in a diagrammatic form the path of the web 114 and location of the cameras 116, 116' and strobe 112, 112'.

Figure 3:
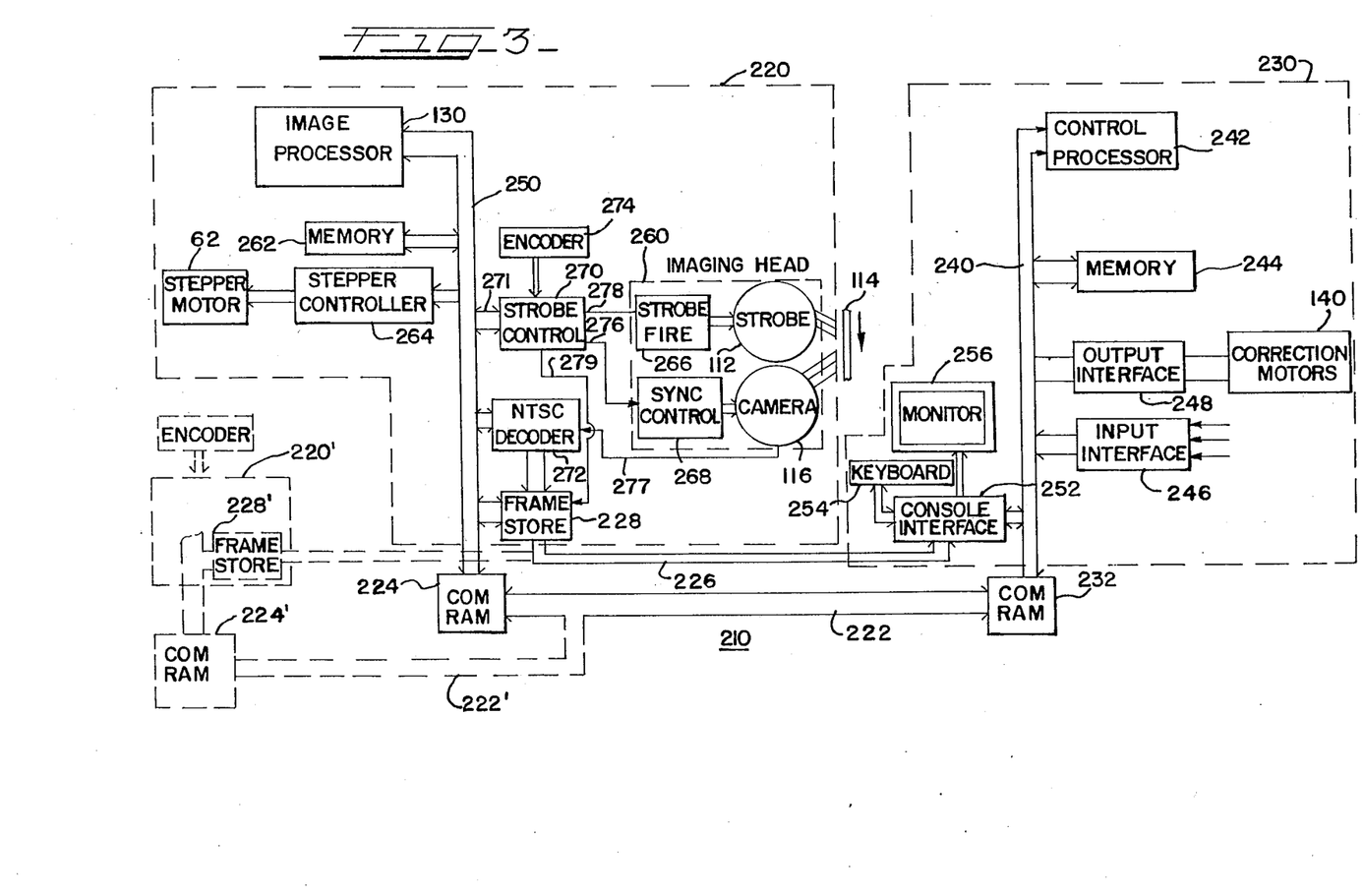
FIG. 3 is a block diagram illustrating a specific embodiment of automatic color to color register control apparatus for a multi-color web printing apparatus in accordance with the invention.

In operation, the cameras 116, 116' and the strobes 112, 112', under control of the control circuitry shown in FIG. 3, stroboscopically acquire an image of a region 115 (approximately 0.2 inch by 0.2 inch in the illustrated embodiment) on the surface of the web which is the field of view (i.e., image field) of the camera 116 and within which the registration mark (not shown) is located at the time the strobe is fired. The image data generated by the camera in acquiring the image is coupled to the control circuitry within the enclosure 64 which analyzes the image data to extract registration information. This information is used to control registration correction motors 140 (see FIG. 3) to maintain color to color registration.

Figures 2A, 2B:
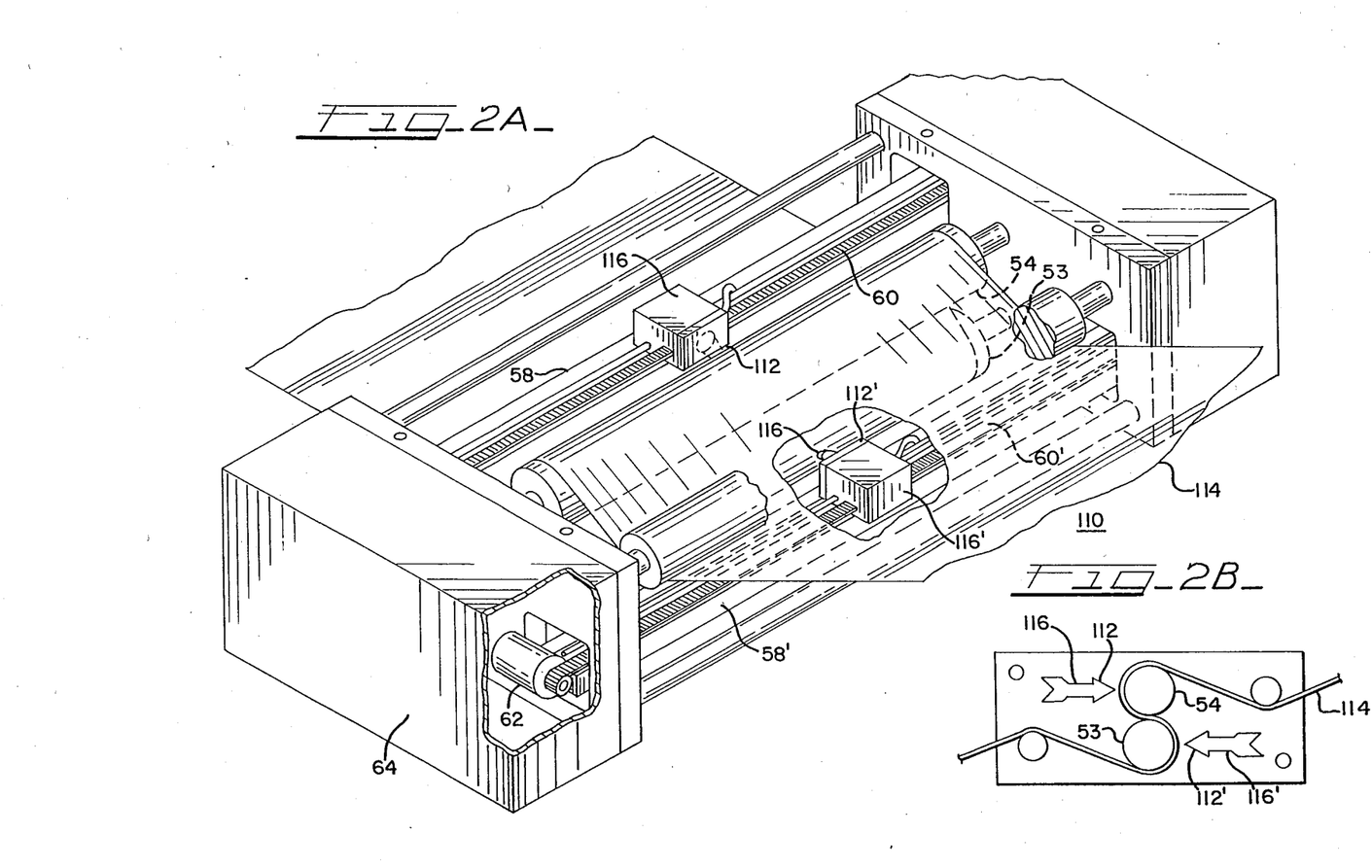
FIG. 2A is a pictorial view illustrating a specific embodiment of web processing apparatus according to the invention.
FIG. 2B is a diagrammatic side view illustrating the specific embodiment of the web processing apparatus shown in FIG. 2A.

The block diagram of FIG. 3 illustrates a specific embodiment of system circuitry 210 for the color to color registration system of the multi-color web printing apparatus 110 of FIG. 2 according to the invention. The system acquires a video image of registration marks (not shown) printed on the moving web 114. Although in the illustrated embodiment the registration marks consist of a pattern of four pairs of dots (one for each of three colors and black), numerous suitable registration marks would be apparent to those skilled in the art. Registration is maintained by acquisition and processing of an image of the printed registration mark by the imaging circuit 220 to determine the shift in the position of the dot pairs relative to each other. This information is then utilized by the control circuitry 230 to generate control signals to adjust the web position via correction motors 140.

The registration control circuitry 210 may include additional imaging circuits 220' to permit use of multiple cameras (e.g., one for each side of the web as shown in FIG. 2) with one control circuit 230. The imaging circuit 220 is coupled to a standard bus 222 through a dual port random access memory (e.g., comprising Hitachi HM6116's) which serves as a communications memory 224, as shown. Each additional imaging circuit 220' is coupled to the bus 222 through its own communications memory and bus as illustrated by the communications memory 224' and the bus 222'. Each imaging circuit 220, 220' also comprises a frame store circuit 228, 228' which is coupled to a frame store bus 226, as shown. The associated circuitry for each imaging circuit is identical to that of the image circuit 220. Therefore, the additional circuitry is not shown in detail and the description of the imaging circuit 220 is applicable to any additional imaging circuits 220'.

The imaging circuit 220 is coupled to the control circuit 230 via the bus 222 through a communications memory 232 which serves as a memory buffer for transfer of data to and from the imaging circuit communications memory 224. Thus, the communications memory circuits 224, 232 serve as interface buffers between the control circuit bus 240 and the imaging circuit bus 250.

The control circuit bus 240 may be a standard bus (e.g., in the illustrated embodiment a STD BUS as marketed by Pro-Log Corp.) for coupling a control processor 242 (e.g., in the illustrated embodiment a 7804A-O processor card as marketed by Pro-Log Corp.) to peripheral circuits. A memory 244 coupled to the bus 240 provides memory (both random access memory such as M5M5128 by OKI and read-only memory such as AMD2764 by Advanced Micro Devices) to provide program and data storage while an input interface 246 provides for input of additional data input to the processor 242 via the bus 240, as shown. A conventional optically coupled output driver 248 (e.g., a 065A optically coupled triac marketed by Opto-22) couples control signals generated by the processor 242 from the bus 240 to the correction motors 140 to control the correction motors and thereby control registration.

Also coupled to the bus 240 is a conventional console interface 252 which provides an interface between the bus 240 and a console keyboard 254, as well as a console monitor 256, as shown. This interface permits operator input (e.g., such as input of registration mark coordinates) to the system circuitry 210 via the keyboard 254 and permits the operator to monitor the system operation. In addition, the console interface 252 couples video image data stored in the frame store memory 228 to the monitor 256 via the bus 226, as shown, thereby permitting the operator to view the acquired images of registration marks on the monitor 256.

The frame store memory 228 is also coupled to the bus 250 of the imaging circuit 220, as shown. The bus 250 is a standard bus (e.g., in the illustrated embodiment a STD BUS as marketed by Pro-Log Corp.) for coupling the image processor 130 (in the illustrated embodiment a 7804A-O processor card marketed by Pro-Log Corp.) to peripheral circuits. A memory 262 is coupled to the bus 250 to provide program and data memory for the image processor 130, and control signals generated by the processor 130 are coupled from the bus 250 to a stepper motor controller and driver 264, as shown. The stepper motor controller 264 drives the stepper motor 62 which positions the camera 116 and strobe 112 over the web as previously described with reference to FIG. 2.

The video camera 116 and the strobe light 112 together with a strobe charge and fire circuit 266 and a camera synchronization circuit 268 (illustrated in greater detail in FIG. 4), configured as shown, form an imaging head 260. The imaging head 260 communicates with the processor 130 and the frame store 228 via a strobe control circuit 270 (shown in greater detail in FIG. 5) and a conventional NTSC to cyan, magenta and yellow decoder 272. The strobe control circuit 270 and the NTSC decoder 272 are coupled to the processor through the bus 250 as shown. Also coupled to the strobe control circuit 270 is a position encoder 274.

Figure 6:
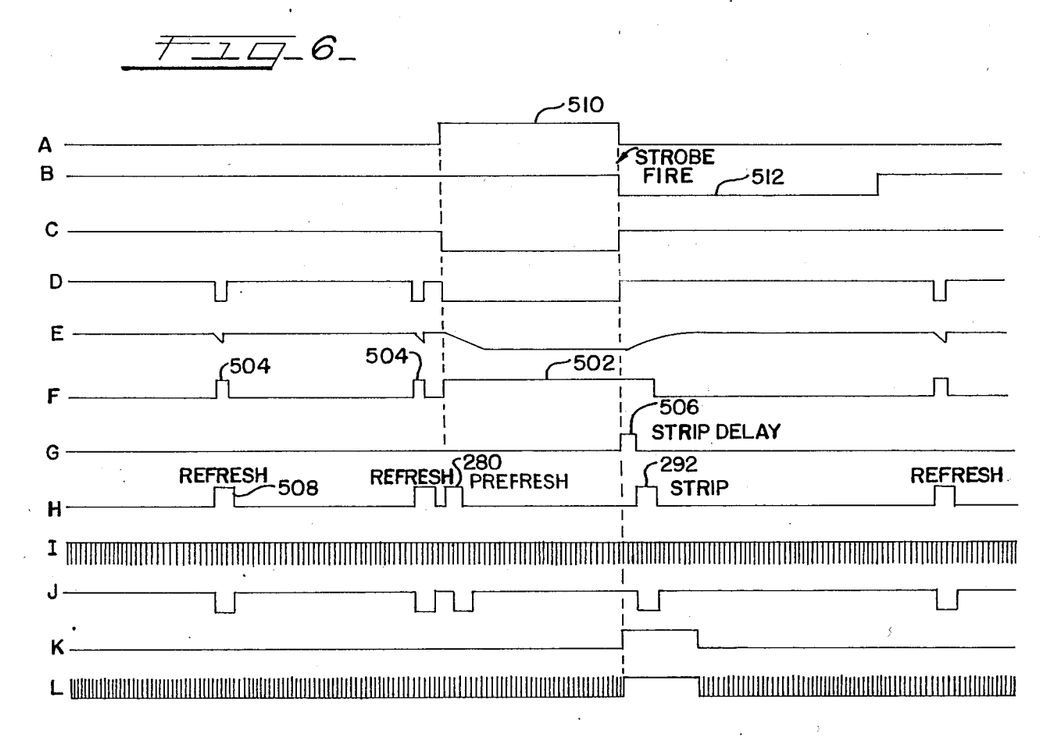
FIG. 6 is a timing diagram illustrating the timing and waveforms associated with the circuitry of FIGS. 3-5.

In operation, the camera synchronization circuit 268 generates periodic scan (i.e., refresh) pulses (one every 20 milliseconds in the illustrated embodiment as illustrated by pulses 508 of waveform H of FIG. 6) which cause the optical sensor of the camera 116 to be periodically stripped and pre-charged in an image acquisition scan cycle (i.e., a complete vertical field scan of the sensor). These pulses maintain the required charge and strip dynamic conditions necessary for proper operation of the camera's image sensor. A predetermined time (20 milliseconds in the illustrated embodiment) before the registration mark is expected to be directly within the image field of the camera 116, the strobe controller 270 under control of the image processor 130 generates a trigger pulse (illustrated as pulse 510 of waveform A in FIG. 6). This trigger pulse is coupled to the camera synchronization control circuit 268 via a conductor 276, as shown. The trigger pulse 510 disables the scan pulses (i.e., the refresh pulses) generation and immediately triggers a new image acquisition scan pulse (a prefresh pulse). This prefresh scan pulse causes the camera to go through a normal image acquisition scan cycle (i.e., vertical field scan of the image sensor) which sets up the sensor (for acquisition of the desired image) during the predetermined time period prior to firing the strobe 112. If the registration mark recurs with a period sufficiently short (e.g., approaching two times the predetermined time period or less) then the refresh pulses will be continuously disabled and only prefresh pulses will be generated prior to actual image data acquisition.

At the end of the predetermined time period (i.e., 20 ms in the illustrated embodiment), a second trigger pulse (pulse 512 of waveform B shown in FIG. 6) is generated by the strobe controller 270 which is coupled to the strobe charge and fire circuit 266 via a conductor 278, as shown. This pulse triggers the firing of the strobe 112 to illuminate the surface of the moving web 114 when the registration mark thereon is within the field of the camera 116. A predetermined time (approximately 0.5 milliseconds in the illustrated embodiment) after the firing of the strobe another scan pulse (strip pulse 292 of waveform H shown in FIG. 6) is generated which triggers the camera to do an image acquisition scan of the image sensor. The video image data (in standard NTSC format) output from the camera 116 as a result of this image acquisition scan is coupled to the NTSC decoder 272 via a conductor 277 in FIG. 3, as shown.

The video image data, which represents the web surface where the registration mark is located, is decoded into pixels of cyan, magenta and yellow by the NTSC decoder. The decoded data is stored in the frame store memory 228 which in the illustrated embodiment may be composed of one 256 by 256 bit digital memory for each color. The frame store memory 228 is triggered to store the image data by a third pulse from the strobe controller 270 coupled to the frame store 228 via a conductor 282, as shown.

While the image acquisition scan of the registration mark is occurring, the strobe charge circuit 302 (shown in FIG. 4) is held in a disabled state by the pulse from the strobe controller 270 on the conductor 278 (see the waveform B in FIG. 6) until after the image acquisition scan is completed. This prevents any interference from being generated by the charging circuits 302 which can destroy image data during the image acquisition cycle.

Figure 5:
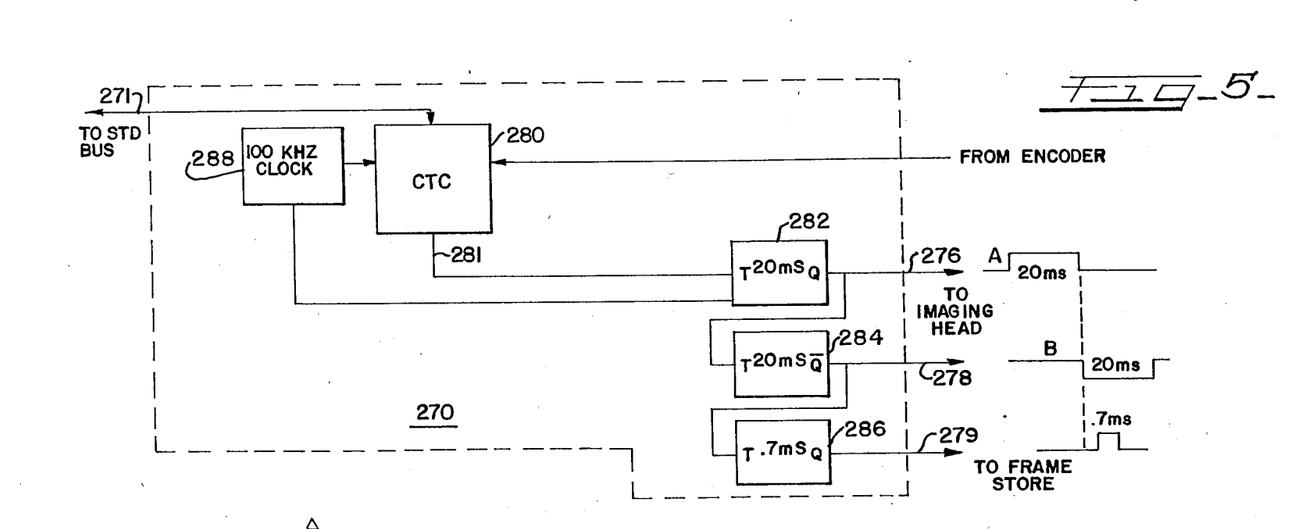
FIG. 5 is a detailed block diagram illustrating a specific embodiment of the strobe controller illustrated in FIG. 3.

The operation of the strobe controller 270 may be more fully understood by reference to FIG. 5 which illustrates a specific embodiment of the strobe controller 270. The controller 270 comprises a counter-timer circuit (CTC) 280 (e.g., utilizing an Intel 8253 CTC) coupled to a counter 282 (e.g., HC404D by National), a set of monostable multivibrators 284, 286 (e.g., Texas Instrument L5221), and a 100 kHz clock circuit 288 (e.g., a STU DS-3C04A with divide by 10), configured as shown. In operation, an encoder index signal coupled from the encoder 274 triggers the counter-timer circuit 280 to begin counting down from a value loaded into a counter-timer circuit 280 by the processor 130 from the standard bus 250 via a bus 271, as shown. This value is based on operator supplied data about the location of the marks (i.e., registration mark coordinates) relative to the beginning of the web printing apparatus repeat length cycle. Thus, counting down from the appropriate number starting from the index pulse, which marks the beginning of the repeat length cycle, produces a timing pulse at the output 281 of the counter-timer circuit 280 a predetermined time prior to the moment when the registration mark is directly within the camera image field-of-view (i.e., a predetermined time prior to the desired time to fire the strobe).

The timing pulse from the counter-timer circuit 280 is coupled, as shown, to the input of the preset counter 282 (i.e., functioning as a precision timing circuit) which produces the precision pulse shown (also shown by the waveform A in FIG. 6) on the output line 276, which in the illustrated embodiment is a 20 millisecond wide pulse. The pulse is produced by counting down the preset counter 282 based on the crystal controlled oscillator pulses which in the illustrated embodiment are generated every 10 microseconds (i.e., 100 kHz). This provides high precision timing of the strobe (i.e., plus or minus 10 microseconds; greater precision can be obtained using a high frequency clock) since the strobe is essentially triggered by the trailing edge of the output of the timer 282.

This pulse is also coupled to the input of the monostable multivibrator 284 which triggers generation of a second pulse (see the waveform B of FIG. 6, again a 20 millisecond pulse wide in the illustrated embodiment) on the output line 278. Finally, this pulse is coupled to the trigger input of the monostable multivibrator 286 which triggers generation on the output line 279 of a pulse, as shown, 0.7 milliseconds after the beginning of the pulse on the output line 278. These three output pulses are connected as shown in FIG. 3 as previously described.

As illustrated in FIG. 6, the leading edge of the pulse 510 of the waveform A on the output line 276 triggers the generation of the prefresh pulse 290 (see waveform H, FIG. 6). The leading edge of the pulse 512 of the waveform B triggers the firing of the strobe 112 and the beginning of the delay period (i.e., triggers the generation of a 0.5 ms delay pulse 506 of the waveform G) prior to the generation of the strip pulse 292 which starts the actual image acquisition scan. The leading edge of the pulse on the output line 282 starts the storage of image data by the frame store 0.7 millisecond after the strobe is fired and therefore 0.2 millisecond after the camera has begun the data acquisition scan cycle. This time delay prevents the storage of meaningless data by the frame store 228 at the beginning of the data acquisition in the illustrated embodiment.

Figure 4:
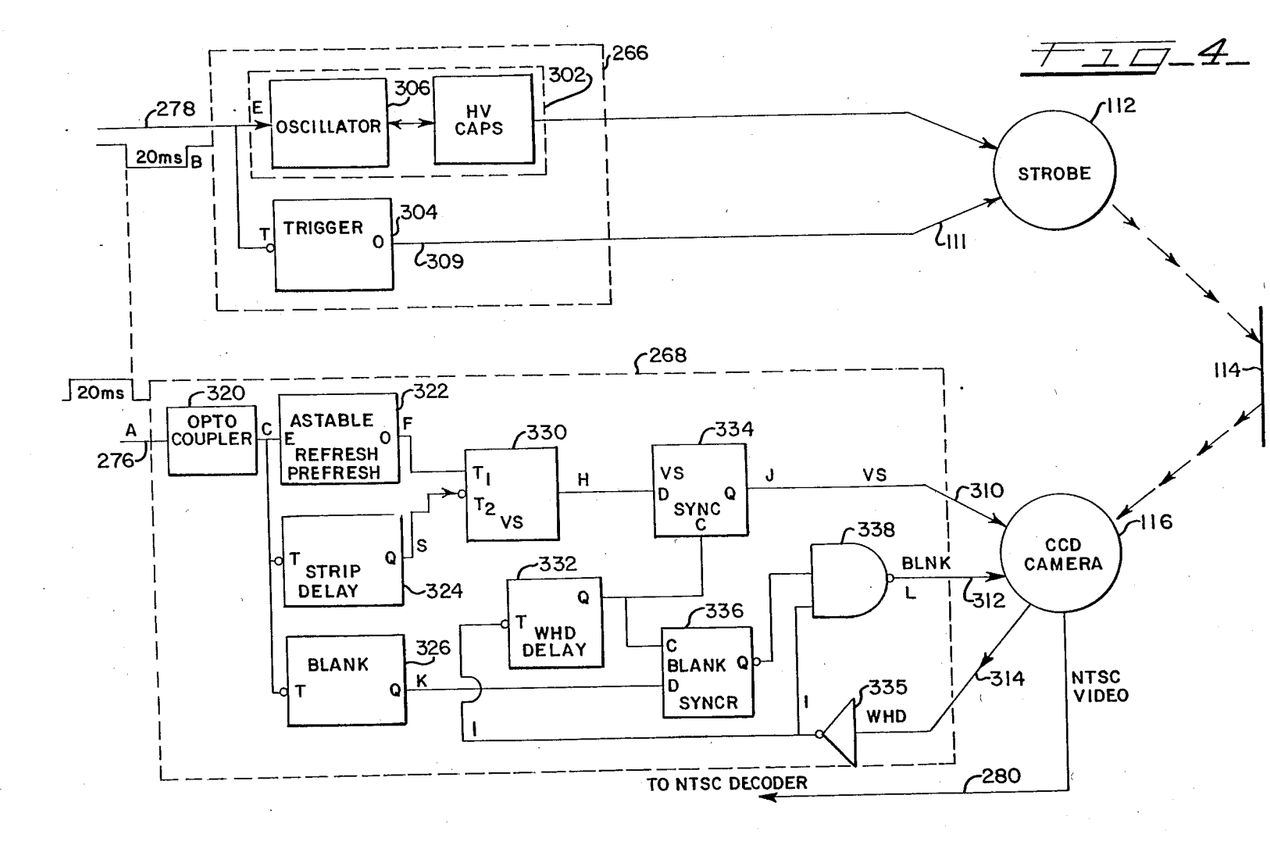
FIG. 4 is a detailed block diagram illustrating a specific embodiment of the imaging head control circuitry illustrated in FIG. 3.

Referring now to FIG. 4, there is shown a detail block diagram of a specific embodiment of the strobe charge and fire circuit 266 and the camera synchronization control circuit 268 shown in FIG. 3. The strobe charge and fire circuit 266 comprises a high voltage circuit 302 and a triggering monostable multivibrator 304. The high voltage circuit 302 includes a conventional oscillator and induction high voltage circuit 306 coupled, as shown, to a high voltage capacitor bank 308. In operation, when the input conductor 278 is held low the oscillator circuit 306 is disabled thereby preventing charging of the capacitors 308. When the input conductor 278 is held high, the oscillator 306 is enabled and generates a high voltage which charges the capacitors 308. The charged capacitors 308 are coupled, as shown, to the strobe light 112.

The input conductor 278 is also coupled, as shown, to the trigger input of the monostable multivibrator 278. A negative edge of the signal on the input conductor 278 triggers the monostable multivibrator 304 to generate a pulse on its output 309. This pulse is coupled to the trigger input 111 of the strobe light 112 and causes the strobe to fire by discharging the high voltage capacitor 308 through the strobe lamp 112. Thus, the strobe light 112 is fired by the leading edge of the waveform on the conductor 278 (the waveform B shown in FIG. 6). Further, recharging of the high voltage circuit 302 is disabled after firing for the duration of the pulse (20 milliseconds in the illustrated embodiment) after which recharging is enabled.

The camera synchronization control circuit 268 provides control signals to the camera 116 in response to the input pulse (waveform A) coupled to he input conductor 276. The circuit of FIG. 4 is a specific embodiment for use with the Panasonic CCD color TV camera, model WV-CD120. This camera includes an internal synchronization generation circuit which generates the various timing control signals (i.e., vertical sync, horizontal sync, color burst, etc.) needed for conventional NTSC video and for proper strip, pre-charge and scanning of the camera's CCD image sensing device.

For the illustrated embodiment of the invention, certain signals of the internal circuit are disabled and replaced by signals generated by the camera synchronization control circuit 268. In the illustrated embodiment, the output 310 of the camera synchronization control circuit 268 generates scan triggering pulses (i.e., refresh pulses) which trigger the vertical field scan cycle of the CCD image sensor of the camera. In the WV-CD120 camera, the normal vertical scan starting signal is a continuous periodic train of scan pulses (one approximately every 16.6 ms for each field scan), referred to as $V_s$ and generated by an MP7260A integrated circuit available from Panasonic. This $V_s$ signal is generated and output at pin 18 of the MP7260A and connected to pin 1 (the $V_p$ input) of a MN50015XPD integrated circuit. The MN50015XPD integrated circuit is a drive pulse generator circuit available from Panasonic which generates the signals required for driving the CCD image sensor of the WV-CD120 camera. In the illustrated embodiment, the $V_s$ signal is disabled by disconnection and is replaced by the signal from the output 310 (waveform A to FIG. 6) of the camera synchronization control circuit 268. Thus, pin 18 of the MP7260A integrated circuit is disconnected from pin 1 of the MN50015XPD integrated circuit and the output 310 is connected to pin 1 of the MN50015XPD integrated circuit.

Another signal generated by the camera synchronization control circuitry 268 is the blanking signal generated on the output conductor 312. Composite blanking signals are generated at pin 7 of the MP7260A circuit which are replaced by the blanking signals generated by the camera synchronization control circuit 268 at the blanking signal output 312. Thus, the pin 7 of the MP7260A integrated circuit is disconnected in the illustrated embodiment and the replacement blanking signals are coupled thereto.

Also, in the illustrated embodiment, the internal circuits of the WV-CD120 camera disable the color burst subcarrier during vertical blanking. Since the camera is operated asynchronously according to the invention, the color burst will sometimes not be available. Therefore, to obtain the desired consistent color burst signal, the color burst generator of the the MP7260A integrated circuit is disabled by disconnecting pin 20 and the output 404 of a color burst generator 400 shown in FIG. 8 (to be described in greater detail hereinafter) is connected to replace the disabled signal. To properly synchronize the color burst signal generated, the MFSYNC signal from the pin 16 of the MP7260A integrated circuit is coupled to the input 402 of the color burst generator circuit 400. In addition, the necessary 3.58 mHz signal is supplied by the SCI output from pin 24 of the MP7260A integrated circuit which is coupled to the input 406 of the color burst generator circuit 400 while the CSYNC output on pin 14 is disconnected and connected to pin 16.

The scan and blanking signals generated by the synchronization control circuit 286 must also be properly synchronized with those of the internal synchronization circuits of the camera. Thus, the wide horizontal drive pulse (WHD, a horizontal scan pulse) from the pin 15 of the MP7260A integrated circuit is coupled to the input 314 of the camera synchronization control circuit 286 to provide a signal for synchronizing to the internal signal of the WV-CD120 camera.

Figure 7:
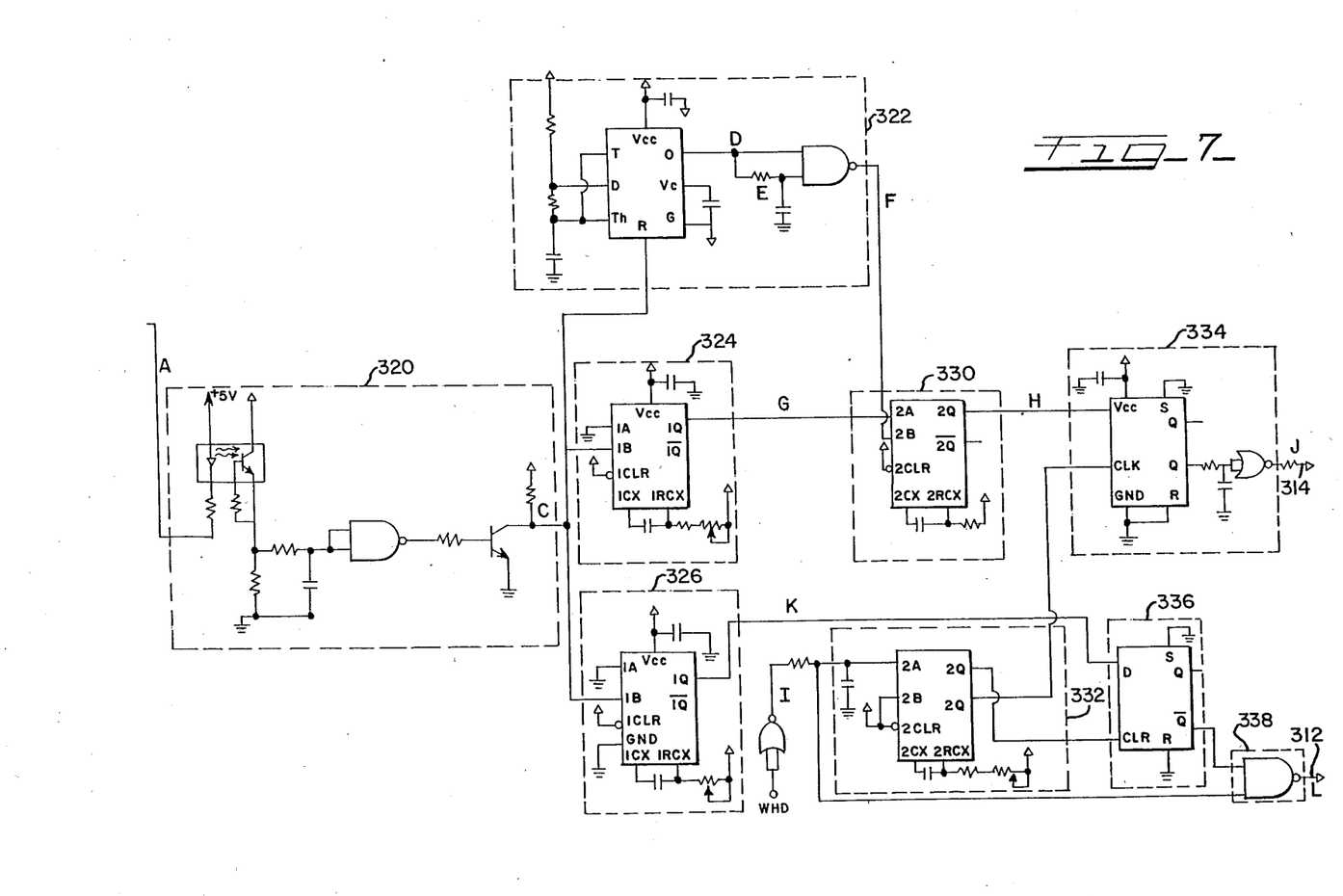
FIG. 7 is a detailed circuit diagram illustrating a specific embodiment of the camera synchronization circuit illustrated in FIG. 4.

The specific embodiment of the camera synchronization control circuit 268 illustrated in FIG. 4 is shown in detail in FIG. 7. FIG. 7 shows the corresponding circuit blocks with dotted lines and reference numerals corresponding to those of FIG. 4. A trigger signal (the waveform A in FIG. 6) is coupled to the input of the camera synchronization control circuit 268 via the input conductor 276. This trigger signal is coupled through the opto-coupler 320 which may be implemented using a Motorola 4N26 opto-coupler in conjunction with optional filtering, NAND gate (e.g., a Motorola CMOS 4093), and drive transistor inverter configured as shown within block 320 of FIG. 7. This coupling circuit 320 inverts the input waveform producing the inverted signal illustrated as the waveform C of FIG. 6. The inverted output of opto-coupler 320 is coupled to the enable input of an astable multivibrator 322, and to the trigger input of a monostable multivibrator 324 and a second monostable multivibrator 326, as shown.

The astable multivibrator 322 produces periodic output pulses continuously (such as shown in waveform F of FIG. 6 as the first two pulses 504) when enabled by a high level coupled to the enable (E) input. Thus, the astable multivibrator 322 produces periodic pulses until it is disabled by a low level at the enable input which occurs, in the illustrated embodiment, 20 milliseconds prior to the firing of the strobe (i.e., at the positive edge of waveform A). The output then stays high, as seen in waveform F of FIG. 6, until a predetermined time (approximately 0.75 milliseconds in the illustrated embodiment) after the strobe is fired at which time the astable multivibrator returns to its free running state. The output of the astable multivibrator 322 thus provides the basis for the continuous refresh pulses 508, and for a signal for producing an enable window pulse 502 to enable the monostable multivibrator 330. The astable multivibrator 322 may be implemented as shown in FIG. 7 utilizing a conventional 555 timer and a conventional NAND gate with capacitor hysteresis on one input, configured as shown. As a result of the hysteresis input to the NAND gate, the waveforms D and E shown in FIG. 6 are generated as indicated in FIG. 7 with the waveform F produced at the output.

The monostable multivibrator 324 produces a 0.5 milliseconds delay pulse (i.e., pulse 506 of the waveform G of FIG. 6) in response to the trailing edge of the pulse of waveform C, which corresponds to the firing of the strobe. Thus, the monostable multivibrator 324 generates a predetermined delay of 0.5 milliseconds which is used to produce the desired delay in generation of the strip pulse (i.e, pulse 292 of the waveform H shown in FIG. 6). The output of the astable multivibrator 322 and the monostable multivibrator 324 are used to trigger a monostable multivibrator 330 as shown. This generates 0.25 millisecond pulses on the output of the monostable multivibrator 330 when the input is triggered by a positive edge, thereby producing the waveform H shown in FIG. 6. Thus, the input from the astable multivibrator 322 produces the refresh pulses 508 and the prefresh pulse 290 while the delay pulse 506 produces the delayed strip and scan pulse 292 with each pulse 0.25 milliseconds wide. This circuit may be implemented as shown in FIG. 7 utilizing a dual input monostable multivibrator (e.g., a high speed CMOS 221 series multivibrator marketed by National) configured as shown in block 330.

Resulting output signals from the monostable multivibrator 330 (i.e., waveform H of FIG. 6) is essentially the scan triggering output signal (used to substitute for the $V_s$ signal generated by the MP7260A integrated circuit) except that it must be synchronized with the signals existing within the camera internal circuitry. Thus, the signal is clocked through a synchronizing flip-flop 334 (e.g., a Motorola CMOS 4013) which inverts the signal, thereby producing the $V_s$ output waveform shown as the waveform J in FIG. 6. The synchronization is provided by using the WHD signal (shown as the waveform I in FIG. 6), the negative edge of which is the beginning of the horizontal blanking period. This signal from the camera's internal synchronization circuitry is applied to the input 314, as shown, and coupled through an inverter 335 to the trigger input of a delay monostable multivibrator 332. The monostable multivibrator 332 delays the WHD signal by 7.7 microseconds and couples the resulting signal to the clock input of the synchronizing flip-flop 334. This results in synchronization of the $V_s$ signal to the middle of the horizontal blanking period. One implementation of this synchronization circuit is shown in FIG. 7, utilizing a Motorola CMOS 4013 flip-flop configured together with a NOR gate which inverts the output and serves as a buffer.

The input signal coupled through the optocoupler 320 is also coupled through the trigger input of the monostable multivibrator 326. The monostable multivibrator 326 generates a 1720 microsecond blanking pulse (waveform K shown in FIG. 6) in response to the trailing edge of the trigger signal (waveform C shown in FIG. 6). This blanking pulse generator may be implemented as shown in FIG. 7 utilizing, for example, a National CMOS 221 multivibrator. The output blanking pulse from the monostable multivibrator 326 is coupled to the input of a synchronizing D flip-flop 336, as shown. The synchronizing circuit 336 is clocked by the delayed WHD signal from the monostable multivibrator 332 thereby generating an output blanking pulse synchronized to the center of the horizontal blanking period. A specific embodiment of the blanking synchronizing circuit 336 (e.g., a Motorola CMOS 4013) is illustrated in detail in FIG. 7.

The synchronized blanking pulse generated by the synchronizing circuit 336 is coupled, as shown, to the input of a NAND gate (e.g., Motorola CMOS 4093) 338. The WHD signal from the internal circuits of the camera 116 is coupled directly to the second input of the logic gate 338, as shown. The resulting output signal from the logic gate 338 on the output 318 is a delayed WHD signal which is blanked for the blanking period generated by the blanking monostable multivibrator 326 (illustrated as waveform L in FIG. 6). This blanking output signal is coupled by the output conductor 312 to the CCD camera 116 to provide blanking signals to the camera and to blank the camera output during the first 1720 microseconds of the image acquisition scan.

Figure 8:
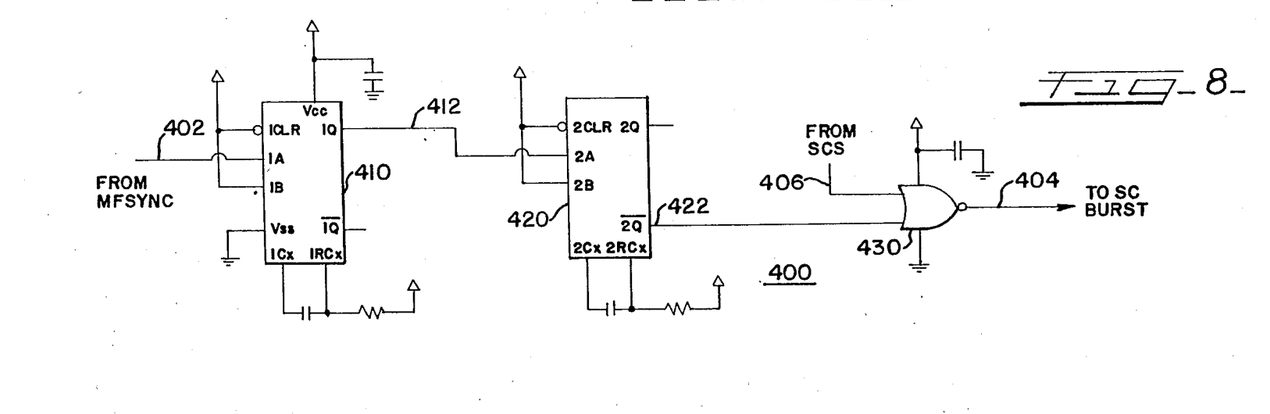
FIG. 8 is a detailed circuit diagram of a color burst generator suitable for use in conjunction with the invention.

Referring now to FIG. 8, there is illustrated a specific circuit 400 for generating the substitute color burst subcarrier signal for the WV-CD120 video camera. The MFSNYC signal from pin 16 of the MP7260A integrated circuit is coupled to the input 402 of a monostable multivibrator 410 (e.g., a Signetics HCT123). The monostable multivibrator 410 produces a pulse delayed by 100 nanoseconds. The delayed pulse is coupled to a second monostable multivibrator 420 (e.g., a Signetics HCT123) via a conductor 412, as shown. The delayed pulse triggers an enable pulse on an output conductor 422 of the monostable multivibrator 420 which is coupled to the input of a NOR gate 430 (e.g., a Signetics HCT02). A second input to the NOR gate 430 is coupled to the SCI output (pin 24 of the MP7260A integrated circuit) of the camera's internal synchronization circuit which provides a source of 3.58 mHz signal. Thus, the enable pulse enables the gate 430 for a period sufficient to produce approximately 8 cycles of color burst signal on its output line 404 at the proper time during the horizontal blanking period. The output 404 is coupled to the color burst line within the CCD camera in the illustrated embodiment by disconnecting the SC burst conductor from pin 20 of the MP7260A integrated circuit and connecting the output 404 to the disconnected conductor. Thus, the color burst circuit 400 provides a color burst signal with the proper timing on a continuous basis to replace the interrupted color burst signal from the MP7260A integrated circuit.

Specific embodiments of the method and apparatus for synchronized image acquisition by a video camera of a predictable asynchronous event illuminated with a high intensity short duration illumination in real time has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any modifications, variations or equivalents that fall within the true spirit and scope of the basic underlying principles disclosed and claimed herein.

What is claimed is:

1. Apparatus for synchronizing high intensity short duration illumination of a substantially predictable asynchronous event in real-time with image acquisition by a video camera having an image sensor and a synchronization generator circuit which generates periodic scan pulses which trigger an image acquisition scan of the image sensor, comprising:
   means for selectively disabling the periodic scan pulses and for generating a prefresh scan pulse for triggering an image acquisition scan of the image sensor a first predetermined time period prior to the substantially predictable event thereby preconditioning the image sensor and disabling image acquisition scan until occurrence of the substantially predictable event; and
   means for triggering an image acquisition scan of the image sensor subsequent to the first predetermined time period to generate image data corresponding to the substantially predictable event.

2. The apparatus of claim 1, further comprising refresh means for generating periodic refresh pulses, and means for disabling the scan pulses generated by the internal synchronization generator circuit and substituting the refresh pulses such that the refresh pulses are utilized as the periodic scan pulses.

3. The apparatus of claim 1 further comprising means for disabling the means for triggering an image acquisition scan for a second predetermined time period after the high intensity short duration illumination.

4. The apparatus of claim 1 wherein the substantially predictable event is substantially predictable within a time window of known duration.

5. The apparatus of claim 1 wherein the substantially predictable event is movement to a location detectable by the video camera of a portion of a printed pattern on a moving web within a web printing apparatus having a known repeat length.

6. The apparatus of claim 5 wherein the desired portion of the printed pattern on the web is a registration mark.

7. The appartus of claim 1 further comprising an illuminator means for providing high intensity, short duration illumination to illuminate the substantially predictable event and means for activating the illuminator means in response to the substantially predictable event.

8. The apparatus of claim 7 further comprising a means for disabling the illuminator means for a period of time immediately after the illuminator is activated, said time period being sufficiently long to prevent the illuminator means from generating interfering signals during the image acquisition scan.

9. The apparatus of claim 1 further comprising storage means for storing the image data.

10. The apparatus of claim 1 wherein the means for triggering comprises a precision timing means for generating a precision first predetermined time period such that the high intensity, short duration illumination is triggered to occur the precision first predetermined time period subsequent to generation of the prefresh scan pulse.

11. The apparatus of claim 1 wherein the first predetermined period is at least as long as the period of the periodic scan pulses.

12. The apparatus of claim 2 wherein the periodic refresh pulses have a period at least as long as the periodic scan pulses.

13. The apparatus of claim 1 wherein the first predetermined period is at least long enough to permit an image acquisition scan of a predetermined portion of the image sensor sufficient to provide desired image data corresponding to the substantially predictable event.

14. A method for synchronizing image acquisition by a video camera to high intensity short duration illumination of a substantially predictable asynchronous event in real time wherein the video camera includes an image sensor, the method comprising the steps of;
   generating periodic refresh pulses to periodically trigger an image acquisition scan of the image sensor;
   disabling the refresh pulses and generating a prefresh pulse a first predetermined time period prior to the substantially predictable event for triggering an image acquisition scan of the image sensor a first predetermined time period prior to the substantially predictable event thereby preconditioning the image sensor and disabling image acquisition scan until occurrence of the substantially predictable event; and generating an image acquisition pulse for triggering an image acquisition scan of the image sensor a second predetermined time period subsequent to the first predetermined time period to generate image information responsive to the substantially predictable event.

15. The method of claim 14 wherein the video camera includes a synchronization generator circuit that generates periodic scan pulses which trigger periodic image acquisition scans of the image sensor, the method further comprising the step of disabling the scan pulses of the synchronization generator circuit and replacing the scan pulses with the periodic refresh pulses.

16. The method of claim 14 further comprising the step of triggering a short duration, high intensity illumination of the substantially predictable event responsive to the substantially predicable event.

17. The method of claim 16, wherein an illuminator requiring pre-charging is utilized for providing the short duration, high intensity illumination, further comprising the step of disabling pre-charging of the illuminator for a time period after the triggering of the illumination.

18. The method of claim 17 further comprising the step of storing the image information.

19. Apparatus for synchronizing high intensity short duration illumination of a substantially predictable recurring asynchronous event in real-time with image acquisition by a video camera, comprising:

a video camera having an image sensor and a synchronization generator circuit which generates periodic scan pulses which trigger image acquisition scans of the image sensor;

means for disabling the periodic scan pulses;

illumination means for providing high intensity, short duration illumination to illuminate the substantially predictable event;

means for activating the illumination means in response to the substantially predictable event including means for pre-charging to enable said activation;

means for triggering an image acquisition scan of the image sensor in response to activation of the illumination means to generate image data corresponding to the substantially predictable event;

means for disabling the means for pre-charging for a first predetermined period subsequent to the activation of the illumination means.

20. The apparatus of claim 19 further comprising means for disabling the means for triggering an image acquisition scan for a second predetermined time period after the activation of the illumination means.

21. The apparatus of claim 20 further comprising means for generating a prefresh scan pulse for triggering an image acquisition scan of the image sensor a third predetermined time period prior to the substantially predictable event.

* * * * *